United States Patent
Hodge

(10) Patent No.: US 10,333,870 B2
(45) Date of Patent: Jun. 25, 2019

(54) PRESENCE-BASED COMMUNICATIONS IN A CONTROLLED ENVIRONMENT

(71) Applicant: **Global Tel*Link Corporation**, Reston, VA (US)

(72) Inventor: Stephen Lee Hodge, Aubrey, TX (US)

(73) Assignee: **Global Tel*Link Corporation**, Reston, VA (US)

(*) Notice: Subject to any disclaimer, the term of this patent is extended or adjusted under 35 U.S.C. 154(b) by 0 days.

(21) Appl. No.: 15/642,857

(22) Filed: Jul. 6, 2017

(65) Prior Publication Data

US 2019/0014062 A1 Jan. 10, 2019

(51) Int. Cl.
| | |
|---|---|
| *H04L 12/58* | (2006.01) |
| *H04L 29/06* | (2006.01) |
| *H04L 29/08* | (2006.01) |
| *H04L 12/24* | (2006.01) |
| *H04N 7/15* | (2006.01) |

(52) U.S. Cl.
CPC ........ *H04L 51/043* (2013.01); *H04L 41/0686* (2013.01); *H04L 65/1069* (2013.01); *H04L 65/1089* (2013.01); *H04L 65/403* (2013.01); *H04L 67/36* (2013.01); *H04N 7/155* (2013.01)

(58) Field of Classification Search
CPC .............. H04L 51/043; H04L 41/0686; H04L 65/1069; H04L 65/1089; H04L 65/403; H04L 67/36; H04N 7/155
See application file for complete search history.

(56) References Cited

U.S. PATENT DOCUMENTS

| | | | |
|---|---|---|---|
| 4,054,756 | A | 10/1977 | Comella et al. |
| 4,191,860 | A | 3/1980 | Weber |
| 4,813,040 | A | 3/1989 | Futato |

(Continued)

FOREIGN PATENT DOCUMENTS

| | | |
|---|---|---|
| WO | WO 00/72571 A2 | 11/2000 |
| WO | WO 01/44977 A2 | 6/2001 |

OTHER PUBLICATIONS

"Automated Coin Toll System (ACTS)," Telephone World, accessed at http://www.phworld.org/payphone/acts.htm, archived by web.archive.org on Feb. 28, 2009.

(Continued)

*Primary Examiner* — Jerry B Dennison
(74) *Attorney, Agent, or Firm* — Sterne, Kessler, Goldstein & Fox P.L.L.C.

(57) ABSTRACT

Disclosed herein are system, method, and computer program product embodiments for providing presence-based communications in a controlled environment. In an embodiment, a presence management system monitors communication status information related to communication devices within a controlled facility as well as communication device external to the controlled facility. Communication statuses indicate the availability of users to receive certain types of communications, such as, for example, video conferencing, audio calls, and/or textual messages. In an embodiment, an inmate of the controlled environment can view communication statuses of external individuals. The presence management system informs the inmate of the availability of the external individuals and facilitates communications between the inmates and external individuals.

20 Claims, 6 Drawing Sheets

(56) References Cited

U.S. PATENT DOCUMENTS

| | | | |
|---|---|---|---|
| 4,935,956 A | 6/1990 | Hellwarth et al. | |
| 4,972,183 A | 11/1990 | Kuhlmann et al. | |
| 5,121,385 A | 6/1992 | Tominaga et al. | |
| 5,319,702 A | 6/1994 | Kitchin et al. | |
| 5,535,596 A | 7/1996 | Todack | |
| 5,539,812 A | 7/1996 | Kitchin et al. | |
| 5,563,931 A | 10/1996 | Bishop et al. | |
| 5,588,041 A | 12/1996 | Meyer, Jr. et al. | |
| 5,638,430 A | 6/1997 | Hogan et al. | |
| 5,655,013 A | 8/1997 | Gainsboro | |
| 5,684,866 A | 11/1997 | Florindi et al. | |
| 5,768,355 A | 6/1998 | Salibrici et al. | |
| 5,774,533 A | 6/1998 | Patel | |
| 5,778,313 A | 7/1998 | Foungies | |
| 5,854,975 A | 12/1998 | Foungies et al. | |
| 5,867,562 A | 2/1999 | Scherer | |
| 5,870,672 A | 2/1999 | Stoddard et al. | |
| 5,872,834 A | 2/1999 | Teitelbaum | |
| 5,875,236 A | 2/1999 | Jankowitz et al. | |
| 5,887,249 A | 3/1999 | Schmid | |
| 5,937,043 A | 8/1999 | He | |
| 6,052,454 A | 4/2000 | Kek et al. | |
| 6,072,860 A | 6/2000 | Kek et al. | |
| 6,134,660 A | 10/2000 | Boneh et al. | |
| 6,226,364 B1 | 5/2001 | O'Neil | |
| 6,289,100 B1 | 9/2001 | Ritter et al. | |
| 6,317,607 B1* | 11/2001 | Tomcik | H04M 1/663 455/552.1 |
| 6,320,946 B1 | 11/2001 | Enzmann et al. | |
| 6,393,269 B1 | 5/2002 | Hartmaier et al. | |
| 6,430,274 B1 | 8/2002 | Winstead et al. | |
| 6,570,891 B1 | 5/2003 | Arimilli | |
| 6,570,970 B2 | 5/2003 | Gruchala et al. | |
| 6,577,718 B1 | 6/2003 | Kalmanek, Jr. et al. | |
| 6,614,781 B1 | 9/2003 | Elliot et al. | |
| 6,639,977 B1 | 10/2003 | Swope et al. | |
| 6,668,044 B1 | 12/2003 | Schwartz et al. | |
| 6,687,350 B1 | 2/2004 | Landry et al. | |
| 6,819,932 B2 | 11/2004 | Allison et al. | |
| 6,836,540 B2 | 12/2004 | Falcone et al. | |
| 7,042,992 B1 | 5/2006 | Falcone et al. | |
| 7,054,430 B2 | 5/2006 | Lynam et al. | |
| 7,079,636 B1 | 7/2006 | McNitt et al. | |
| 7,080,049 B2 | 7/2006 | Truitt et al. | |
| 7,092,494 B1 | 8/2006 | Anders et al. | |
| 7,102,509 B1 | 9/2006 | Anders et al. | |
| 7,106,843 B1 | 9/2006 | Gainsboro et al. | |
| 7,184,747 B2 | 2/2007 | Bogat | |
| 7,197,560 B2 | 3/2007 | Caslin et al. | |
| 7,333,798 B2 | 2/2008 | Hodge | |
| 7,496,345 B1 | 2/2009 | Rae et al. | |
| 7,505,406 B1 | 3/2009 | Spadaro et al. | |
| 7,643,518 B2 | 1/2010 | Salter et al. | |
| 7,766,223 B1 | 8/2010 | Mello et al. | |
| 7,860,133 B2 | 12/2010 | Salter et al. | |
| 7,899,167 B1 | 3/2011 | Rae | |
| 8,014,800 B2 | 9/2011 | Tornkvist | |
| 8,295,446 B1 | 10/2012 | Apple et al. | |
| 8,355,492 B1 | 1/2013 | Polozola et al. | |
| 8,477,766 B2 | 7/2013 | Kwon | |
| 8,489,068 B1 | 7/2013 | Edwards et al. | |
| 8,577,003 B2 | 11/2013 | Rae | |
| 8,626,118 B2 | 1/2014 | Smith et al. | |
| 8,794,509 B2 | 8/2014 | Bishop et al. | |
| 8,838,622 B2* | 9/2014 | Irving | G09B 7/00 707/754 |
| 8,929,524 B2 | 1/2015 | Hodge | |
| 9,014,355 B2 | 4/2015 | Heaton et al. | |
| 9,509,856 B2 | 11/2016 | Heaton et al. | |
| 9,578,128 B2* | 2/2017 | Nerieri | H04L 67/327 |
| 2002/0041660 A1 | 4/2002 | Nakamura | |
| 2002/0076025 A1* | 6/2002 | Liversidge | G06Q 10/10 379/202.01 |
| 2002/0103899 A1 | 8/2002 | Hogan et al. | |
| 2002/0131374 A1 | 9/2002 | Lee | |
| 2002/0143655 A1 | 10/2002 | Elston | |
| 2002/0168060 A1 | 11/2002 | Huie | |
| 2002/0183040 A1 | 12/2002 | Lundstrom et al. | |
| 2003/0002639 A1 | 1/2003 | Huie | |
| 2003/0037133 A1 | 2/2003 | Owens | |
| 2003/0086546 A1 | 5/2003 | Falcone et al. | |
| 2003/0193961 A1 | 10/2003 | Moore et al. | |
| 2003/0220884 A1 | 11/2003 | Choi et al. | |
| 2003/0229613 A1 | 12/2003 | Zargham et al. | |
| 2004/0029564 A1 | 2/2004 | Hodge | |
| 2004/0058667 A1 | 3/2004 | Pienmaki et al. | |
| 2004/0090953 A1 | 5/2004 | Salter et al. | |
| 2004/0114739 A1 | 6/2004 | Hausmann et al. | |
| 2004/0153396 A1 | 8/2004 | Hinderer | |
| 2004/0173674 A1 | 9/2004 | Matsuura | |
| 2005/0009525 A1 | 1/2005 | Evslin | |
| 2005/0123111 A1 | 6/2005 | Philbin et al. | |
| 2005/0125411 A1 | 6/2005 | Kilian et al. | |
| 2005/0135579 A1 | 6/2005 | Creamer et al. | |
| 2005/0238154 A1 | 10/2005 | Heaton et al. | |
| 2006/0098796 A1 | 5/2006 | Link | |
| 2006/0149644 A1 | 7/2006 | Sulmar et al. | |
| 2007/0155411 A1 | 7/2007 | Morrison | |
| 2007/0263812 A1 | 11/2007 | Polozola et al. | |
| 2008/0108382 A1 | 5/2008 | Salter et al. | |
| 2008/0112436 A1 | 5/2008 | Salter et al. | |
| 2008/0175362 A1 | 7/2008 | Bangor et al. | |
| 2008/0220739 A1 | 9/2008 | Muoio et al. | |
| 2008/0311888 A1* | 12/2008 | Ku | H04M 7/0024 455/414.1 |
| 2009/0019376 A1* | 1/2009 | Quillen | H04L 67/36 715/753 |
| 2009/0042539 A1 | 2/2009 | Jiang et al. | |
| 2009/0054031 A1 | 2/2009 | Smith et al. | |
| 2009/0180600 A1 | 7/2009 | Blackwell et al. | |
| 2009/0304166 A1 | 12/2009 | Hodge | |
| 2010/0035594 A1* | 2/2010 | Vendrow | H04M 3/436 455/417 |
| 2010/0097440 A1* | 4/2010 | Lee | H04N 7/147 348/14.02 |
| 2011/0004635 A1* | 1/2011 | Chesbrough | G06Q 50/22 707/803 |
| 2012/0079045 A1* | 3/2012 | Plotkin | H04L 51/12 709/206 |
| 2012/0079591 A1* | 3/2012 | Hassan-Le Neel | H04W 4/00 726/22 |
| 2012/0155628 A1 | 6/2012 | Booth et al. | |
| 2012/0202454 A1 | 8/2012 | Smith et al. | |
| 2013/0080510 A1 | 3/2013 | Leftik et al. | |
| 2013/0094640 A1 | 4/2013 | McClure | |
| 2013/0263227 A1* | 10/2013 | Gongaware | H04L 63/08 726/4 |
| 2013/0275516 A1* | 10/2013 | Grant | H04M 1/72569 709/206 |
| 2014/0267547 A1 | 9/2014 | Torgersrud et al. | |
| 2015/0030314 A1* | 1/2015 | Skarakis | G06K 9/00335 386/278 |
| 2015/0078541 A1 | 3/2015 | Hodge | |
| 2015/0229776 A1 | 8/2015 | Heaton et al. | |
| 2016/0028900 A1 | 1/2016 | Heaton et al. | |
| 2016/0191453 A1* | 6/2016 | Thomas | H04W 4/12 709/206 |
| 2017/0180564 A1 | 6/2017 | Heaton et al. | |
| 2017/0230314 A1* | 8/2017 | Odell | H04L 51/04 |
| 2017/0251100 A1 | 8/2017 | Keiser et al. | |
| 2017/0264579 A1* | 9/2017 | Fang | H04L 51/12 |

OTHER PUBLICATIONS

"Cisco IAD2400 Series Business-Class Integrated Access Device", Cisco Systems Datasheet, 2003.

"Customer Owned Coin Operated Telephones (COCOT)," Telephone World, accessed at http://www.phworld.org/payphone/cocot.htm, archived by web.archive.org on Jan. 27, 2009.

"History and Key Milestones," Logica, accessed at http://www.logica.com/history+and+key+milestones/350233679, archived by web.archive.org on Dec. 24, 2009.

(56) References Cited

OTHER PUBLICATIONS

"SIP and IPLinkTM in the Next Generation Network: An Overview," Intel, 2001.
"Survey of Telephone Switching: Chapter 11," Telephone Tribute, accessed at http://www.telephonetribute.com/switches survey chapter 11 .html, archived by web.archive.org on Jul. 14, 2009.
"Voice Over Packet in Next Generation Networks: An Architectural Framework," Bellcore, Special Report SR-4717, Issue 1, Jan. 1999.
"Criminal Calls: A Review of the Bureau of Prisons' Management of Inmate Telephone Privileges," U.S. Department of Justice, Office of the Inspector General, Aug. 1999.
"VoIP Adoption Still Growing in Consumer and Business Markets," accessed at http://www.voicewalker.net/news/voip-adoption-stillgrowing-in-consumer-and-business-markets/, archived by web.archive.org on Jul. 28, 2012; 2 pages.
"Why Can't You Make a Collect Call to a Cell Phone," National Public Radio, Jun. 30, 2008, Accessed via http://www.npr.org/templates/story/story.php?storyId=92021561 on Apr. 6, 2015.
1800MumDad.com.au—Explanation, Aug. 29, 2007—Retrieved from the Internet Archive Wayback Machine at https://web.archive.org/web/20070829114354/http://1800mumdad.com.au/main.php?type=charges2; 2 pages.
1800MumDad.com.au—Summary Standard Form of Agreement, Apr. 26, 2006—Retrieved from the Internet Archive Wayback Machine at https://web.archive.org/web/20060426180115/http://www.1800mumdad.com.au/main.php?type=summarysfoa; 3 pages.
Ahimovic et al., "Services for Tomorrow's PCS," IEEE International Conference on Universal Personal Communications, vol. 1, Oct. 12-15, 1993; pp. 222-227.
Assignment of U.S. Pat. No. 8,190,121 and U.S. Appl. No. 13/449,308.
Brown, et al., "SMS: The Short Message Service," Computer, vol. 40, No. 12, 2007.
BubbleLINK® Software Architecture (Science Dynamics 2003).
Bur Goode, Voice Over Internet Protocol (VoIP), Proceedings of the IEEE, vol. 90, No. 9, 1495-1517 (Sep. 2002).
Clifford J. Weinstein, MIT, The Experimental Integrated Switched Network—A System-Level Network Test Facility (IEEE 1983).
Commander Call Control System, Rev. 1.04 (Science Dynamics 2002).
Confalone et al., "Calling Card Service—TSPS Hardware, Software, and Signaling Implementation," The Bell System Technical Journal, Sep. 1982, vol. 61, No. 7; pp. 1675-1714.
Defendant Global Tel*Link Corporation's Amended Answer to First Amended Complaint and Counterclaims, filed in *Securus Technologies, Inc.* v. *Global Tel*Link Corporation*, Case No. 3:16-cv-01338-K (N.D. Tex.), filed Jan. 9, 2017; 66 pages.
Definition of "circuit switching", Newton's Telecom Dictionary, New York: Flatiron Publishing, Inc., 1996; p. 253.
Definition of "code", Microsoft Computer Dictionary, 5th Edition, Redmond, WA: Microsoft Press, 2002; p. 106.
Definition of "telephony", McGraw-Hill Dictionary of Scientific and Technical Terms, 6th Edition (McGraw-Hill, 2003).
Definitions of "code", "comprise", "number", and "including", The American Heritage College Dictionary, 3rd Edition (Houghton Mifflin Company, 1997); 10 pages.
Definitions of "Local Area Network (LAN)" and "Wide Area Network (WAN)," Microsoft Computer Dictionary (Microsoft Press 2002), pp. 304 and 561.
"Bellcore Notes on the Networks," Bellcore, Special Report SR-2275, Issue 3, Dec. 1997.
Disclaimer filed Jul. 31, 2014 in U.S. Appl. No. 12/969,068 (U.S. Pat. No. 8,477,766).
Excerpts from the Prosecution History of U.S. Appl. No. 10/135,878, filed Apr. 29, 2002.
File History of U.S. Appl. No. 14/703,639, filed May 4, 2015; 189 pages.
File History of U.S. Pat. No. 7,899,167, U.S. Appl. No. 10/642,532, filed Aug. 15, 2003.
File History of U.S. Pat. No. 8,190,121, U.S. Appl. No. 12/103,138, filed Apr. 15, 2008.
File History of U.S. Pat. No. 8,489,068, U.S. Appl. No. 12/766,159, filed Apr. 23, 2010.
File History of U.S. Pat. No. 8,577,003, U.S. Appl. No. 13/009,483, filed Jan. 19, 2011.
File History of U.S. Pat. No. 8,626,118, U.S. Appl. No. 13/449,308, filed Apr. 17, 2012.
File History of U.S. Pat. No. 9,509,856, U.S. Appl. No. 14/689,521, filed Apr. 17, 2015.
Reexamination U.S. Appl. No. 90/012,802 of U.S. Pat. No. 8,190,121, filed Mar. 1, 2013.
Garner, et al., "Mobile Terminated SMS Billing—Exploits and Security Analysis," IEEE International Conference on Information Technology: New Generations, 2006.
International Search Report and Written Opinion directed to International Patent Application No. PCT/US2017/031947, dated Aug. 10, 2017; 17 pages.
Ismail, et al., "Prepaid and Postpaid VoIP Service Enhancements 1013 and Hybrid Network Performance Measurement," Information Technology Journal, vol. 5, Issue 2, 2006.
Jeff Hewett and Lee Dryburgh, Signaling System No. 7 (SS7/C7): Protocol, Architecture, and Services (Networking Technology) at 85 (Cisco Press, Jun. 2005).
McKitterick et al., "State of the Art Review of Mobile Payment Technology," Department of Computer Science, Trinity College Dublin; 22 pages.
Office Action directed to European Patent Application No. 03 772 898.7, dated Jun. 9, 2008.
Operator Service System Generic Requirements, OSSGR, TR-TSY-000271, Collect Billing, Rev. 3, Mar. 1988; 50 pages.
Osifchin, N., "A Telecommunications Buildings/Power Infrastructure in a New Era of Public Networking," IEEE 2000.
PacketCableTM 1.0 Architecture Framework Technical Report, PKT-TR-ARCH-V0 1-001201 (Cable Television Laboratories, Inc. 1999).
Pages from http://www.corp.att.com/history, archived by web.archive.org on Nov. 4, 2013.
Photocopy of "Bellcore Notes on the Networks (Formerly BOC Notes on the LEC Networks)," Bellcore, Special Report SR-2275, Issue 3, Dec. 1997.
Response to Office Action, filed Jan. 6, 2009, in Prosecution History of U.S. Appl. No. 10/642,532, filed Aug. 15, 2003.
Rey, R.F., ed., "Engineering and Operations in the Bell System," 2nd Edition, AT&T Bell Laboratories: Murray Hill, NJ, 1983.
Rosenberg, et al., "SIP: Session Initial Protocol," Network Working Group, Standard Track, Jun. 2002; 269 pages.
Schwartz, et al., "How to Build an SMS Service," O'Reilly Short Cuts, 2007.
Science Dynamics, Inmate Telephone Control Systems, http://scidyn.com/fraudprev_main.htm (archived by web.archive.org on Jan. 12, 2001).
Science Dynamics, SciDyn BubbleLink, http://www.scidyn.com/products/bubble.html (archived by web.archive.org on Jun. 18, 2006).
Science Dynamics, SciDyn Call Control Solutions: Commander II, http://www.scidyn.com/products/commander2.html (archived by web.archive.org on Jun. 18, 2006).
Science Dynamics, SciDyn IP Gateways, http://scidyn.com/products/ipgateways.html (archived by web.archive.org on Aug. 15, 2001).
Science Dynamics, Science Dynamics—IP Telephony, http://www.scidyn.com/iptelephony_maim.htm (archived by web.archive.org on Oct. 12, 2000).
Sundstrom, K., "Voice over IP: An Engineering Analysis," Master's Thesis, Department of Electrical and Computer Engineering, University of Manitoba, Sep. 1999.
The Line Information Database (LIDB) and Wireless Services, Telcordia Technologies White Paper, Dec. 2001; 31 pages.
U.S. Appl. No. 60/935,634, "Method of Enabling an SMS Text Message to Facilitate Payment on a Cellular Bill for a Billable Call Received on a Cell Phone," to Martin, et al., filed Aug. 23, 2007.
U.S. Appl. No. 12/766,159, "System and Method for Completion of All Calls Using Single Call Funding Options," to Edwards et al., filed Apr. 23, 2010; 39 pages.

(56) References Cited

OTHER PUBLICATIONS

Valcourt, et al., "Investigating mobile payment: Supporting technologies, methods, and use," IEEE International Conference on Wireless and Mobile Computing, Networking, and Communications, 2005.

Wireless Interconnection and Reciprocal Compensation Agreement Between Community Telephone Company and United States Cellular Corporation, Apr. 24, 2006; 29 pages.

* cited by examiner

PRESENCE-BASED COMMUNICATIONS IN A CONTROLLED ENVIRONMENT

BACKGROUND

Field

The disclosure relates to a system and method for providing presence-based communications within a controlled environment.

Background

In a controlled environment, such as a correctional facility, inmates have limited opportunities to communicate with individuals external to the controlled environment. Although inmates sometimes are able to communicate with external individuals via phone calls or video messaging, inmates are often limited to scheduling the communication to ensure that the external individual is free for communication. Without scheduling, inmates risk attempting to contact the external individual when the external individual is not available. This scenario may lead to inmates failing to establish communications with the desired external individual, limiting the conferencing abilities of the inmates.

BRIEF DESCRIPTION OF THE DRAWINGS

The accompanying drawings are incorporated herein and form a part of the specification.

Figure 1:
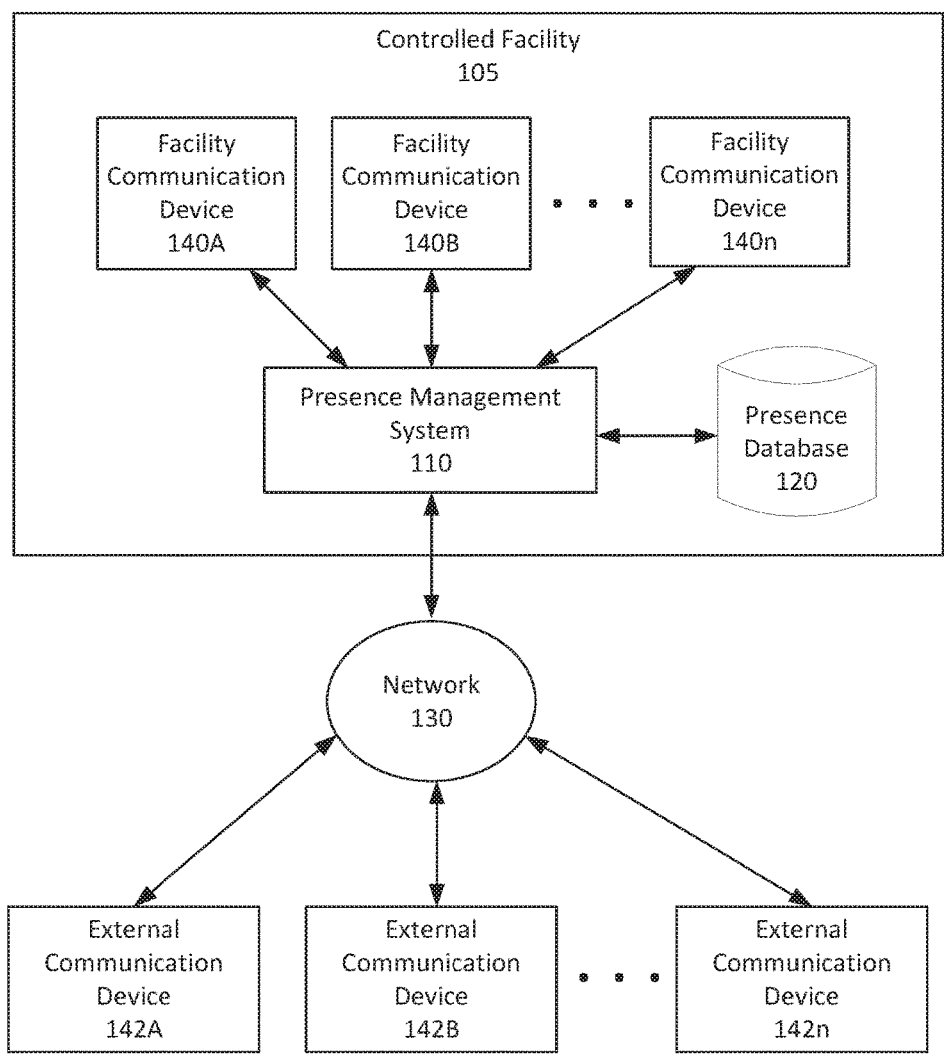
FIG. 1 illustrates a block diagram of a presence monitoring environment, according to exemplary embodiments.

The present disclosure will be described with reference to the accompanying drawings. In the drawings, like reference numbers generally indicate identical or similar elements. Additionally, generally, the left-most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, or hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Provided herein are system, apparatus, device, method and/or computer program product embodiments for providing presence-based communications within a controlled environment.

In an embodiment, the systems and methods described herein provide communication statuses related to inmates within a controlled environment as well as communication statuses related to individuals external to the controlled environment. Inmates and/or external individuals may view the communication statuses using a graphical user interface (GUI) displayed on a facility communication device or an external communication device. In an embodiment, these communication devices are phones or tablets with display screens capable of facilitating textual, telephonic, or video communications. The GUI provides a listing of inmates and external individuals along with a corresponding communication status. The inmates or external individuals may select a communication status to be displayed to others depending on the available of the inmate or external individual. For example, a selected communication status may indicate that an individual is available for video conferencing, audio conference, email or text communication, or that the individual is not available for communication.

In this manner, for example, an inmate will be able to view the communication status of an external individual and determine whether the external individual is available for communication as well as the type of communication the external individual is willing to accept. In an embodiment, the communication status is displayed on a GUI that is displayed on an inmate communication device that allows the inmate to communicate with the external individual.

Similar to the inmate, the external individual will be able to view the communication status of the inmate and determine if communication is permitted. If the inmate indicates that the inmate is available based on the inmate's communication status, the external individual can initiate a communication with the inmate. In an embodiment, a controlled environment presence management system maintains a list of permitted and/or prohibited communications, communication statuses, and/or deposit funding accounts related to costs associated with communications. The presence management system connects inmate communication devices with external individual communication devices, providing communication statuses to both communication devices, facilitating communications between both communication devices, and monitoring established communications between both communication devices.

FIG. 1 illustrates a block diagram of a presence monitoring environment 100, according to exemplary embodiments. In an embodiment, presence monitoring environment 100 includes a controlled facility 105. Controlled facility 105 is a facility that houses and/or detains individuals for a prolonged amount of time. For example, controlled facility 105 may be a jail, prison, hospital, rehabilitation clinic, or nursing home. In an embodiment, controlled facility 105 houses inmates. The inmates of controlled facility 105 utilize facility communication devices 140 to communicate with other inmates of controlled facility 105 or with individuals external to controlled facility 105.

In an embodiment, inmates utilize facility communication devices 140 to communicate with external communication devices 142. Facility communication devices 140 and external communication devices 142 are devices capable of allowing email, text, video, and/or audio communications. For example, facility communication devices 140 and external communication devices 142 may include smartphones, tablets, computers, laptops, workstations, kiosks, and/or virtual reality equipment. In an embodiment, facility communication devices 140 include hardware designed specifically for use within controlled environment 105 while external communication devices 142 include commercial communication hardware.

In an embodiment, to communicate with an external communication device 142, a facility communication device 140 communicates with presence management system 110 and network 130. Presence management system 110 communicates with the facility communication devices 140 of controlled facility 105 and facilitates communications to external communication devices 142 using network 130 and/or a network protocol to send and receive data over network 130. In an embodiment, network 130 is a network capable of transmitting information either in a wired or wireless manner and may be, for example, the Internet, a Local Area Network, or a Wide Area Network. The network protocol may be, for example, a hypertext transfer protocol (HTTP), a TCP/IP protocol, User Datagram Protocol (UDP), Ethernet, cellular, Bluetooth, or an asynchronous transfer mode, to name just a few examples, or any combination thereof.

In an embodiment, presence management system 110 includes one or more processors, memory, servers, routers, modems, and/or antennae configured to interface with presence database 120, network 130, facility communication devices 140, and/or external communication devices 142. In an embodiment, presence management system 110 controls communications between facility communication devices 140 and external communication devices 142. For example, presence management system 110 may deliver email or text communications, facilitate an audio call, and/or facilitate a video conference between the communication devices. To establish this communication, presence management system 110 utilizes network 130 and the network protocols discussed above. In an embodiment, presence management system 110 facilitates communications between facility communication device 140. This communication may be, for example, two inmates communicating with each other in controlled facility 105. In an embodiment, presence management system 110 facilitates communications between external communication devices 142. This communication may be, for example, two individuals external to controlled facility 105. In an embodiment, presence management system 110 facilitates communications between a facility communication device 140 and an external communication device 142. This communication may be, for example, an inmate communicating with an individual external to controlled facility 105. The inmate may be contacting a friend, spouse, significant other, family, attorney, doctor, therapist, and/or other person registered to use presence management system 110 and communicate with the inmate.

In an embodiment, presence management system 110 facilitates group communication between facility communication devices 140 and/or external communication devices 142. For example, presence management system 110 may facilitate group text messages, audio calls, and/or video conferences between facility communication devices 140 and/or external communication devices 142. Group messaging may allow an inmate to communicate with multiple external parties simultaneously and/or may allow an external individual to communicate with multiple inmates simultaneously.

In an embodiment, presence management system 110 also facilitates other communication features such as data sharing, desktop sharing, interactive whiteboard interfacing, project collaboration, and/or three-way calling. In an embodiment, presence management system 110 utilizes a WebRTC protocol to facilitate communications between a facility communication device 140 and/or an external communication device 142. In an embodiment, presence management system 110 utilizes a Unified Communications protocol to facilitate the communications. In an embodiment, facility communication device 140 and/or external communication device 142 generates a graphical user interface using a software application and/or an API installed on facility communication device 140 and/or external communication device 142.

In an embodiment, presence management system 110 receives, transmits, and/or maintains communication statuses related to users of facility communication devices 140 and/or external communication devices 142. In an embodiment, presence management system 110 may store the communication statuses in presence database 120. Presence database 120 may be one or more memory devices, including volatile and/or non-volatile memory, configured to store communication status information, facility communication device 140 information, external communication device 142 information, and/or account information related to users of presence management system 110.

In an embodiment, presence management system 110 monitors communication statuses related to the users of facility communication devices 140 and external communication devices 142. These communication statuses indicate whether the user associated with the communication device is available or unavailable for communication. In an embodiment, the communication statuses also indicate which types communications the user is willing to accept. For example, a user may specify that the user is willing to accept:

1) Text Messages, Audio Calls, and Video Conferences;
2) Only Text Messages and Audio Calls;
3) Only Text Messages; or
4) No Communications.

In an embodiment, a Text Message may specify between emails and/or chat messages, such as instant messaging. In an embodiment, the communication status may indicate other communication features such as data sharing, desktop sharing, interactive whiteboard interfacing, project collaboration, and/or three-way calling.

In an embodiment, presence management system 110 associates a user's communication status with a user account and stores the association in presence database 120. Presence management system 110 then monitors the user account and the communication device associated with the user account to determine if any changes occur to the user's communication status. In an embodiment, presence management system 110 detects the change in the user's communication status and updates the associated communication status stored in presence database 120 accordingly. In an embodiment, a user may utilize a communication device to update his or her communication status and may send a request to presence management system 110 to indicate the updated communication status. Presence management system 110 will then update the associated communication status stored in presence database 120.

Along with associating and storing communication statuses, presence management system 110 also transmits communication statuses to facility communication devices 140 and/or external communication devices 142. For example, presence management system 110 and/or presence database 120 may maintain one or more lists specifying connections between user accounts and communication devices, such that when a first user account is updated with a new communication status, presence management system 110 transmits a notification to other communication devices configured to receive updates regarding the communication status of the first user account. In this manner, presence management system 110 may provide "presence" information to different communication devices, allowing the communication devices to determine the communication availability of other communication devices.

To illustrate an embodiment of the operation of presence management system 110, presence management system 110 receives a first communication status from external communication device 142A. Presence management system 110 retrieves from presence database 120 a first user account associated with external communication device 142A. In an embodiment, the first user account becomes associated with external communication device 142A via a log-in or registration procedure. In response to the receiving the first communication status, presence management system 110 associates the first communication status with the first user account. This association causes presence management system 110 to identify a list of other user accounts linked to the first user account. The other user accounts are configured to receive communication status updates from the first user account. Similarly, the first user account receives communication status updates from the other user accounts. In an embodiment, a second user account, that is part of the other user accounts, is associated with facility communication device 140A. After recognizing that the second user account is included in the list of user accounts configured to receive communication statuses from the first user account, presence management system transmits the first communication status to facility communication device 140A. Facility communication device 140A then displays the first communication status for the user of facility communication device 140A to view.

In an embodiment, a third user account associated with external communication device 142B may also be included on the list. In this case, presence management system 110 will also transmit the first communication status to external communication device 142B.

In an embodiment, external communication device 142A transmits an updated communication status to presence management system 110. In this case, presence management system 110 updates the associated communication status of the first user account with the updated communication status and transmits the updated communication status to other communication devices corresponding to user accounts listed to receive updated communication statuses from the first user account.

In an embodiment, facility communication devices 140 and external communication devices 142 are configured to display a graphical user interface indicating the communication statuses of other facility communication devices 140 and/or other external communication devices 142. These communication statuses relate to inmate user accounts and external individual user accounts registered to communicate with each other.

To illustrate an example, a daughter of an inmate may utilize external communication device 142A to indicate that she is available to communicate using Text Messages, Audio Calls, and Video Conferences because she is at home. In an embodiment, the daughter sets this communication status using a software application installed in the daughter's external communication device 142A, that may be a smartphone, tablet, or computer. When the daughter goes to school, however, the daughter may update her communication status to communicate using Only Text Messages. External communication device 142A then transmits the updated communication status to presence management system 110. Presence management system 110 then associates the updated communication status with the daughter's user account. Presence management system 110 also recognizes that the inmate's account is configured to receive communication status updates from the daughter's user account. As such, presence management system 110 recognizes that the inmate is using facility communication device 140B. Presence management system 110 then transmits the updated communication status to facility communication device 140B so that the inmate can view the daughter's updated communication status.

Based on seeing the daughter's update communication status, the inmate can utilize facility communication device 140B to communicate with the daughter. In an embodiment, the communication status acts as a suggestion, displaying a preference method of communication but giving the daughter the choice to receive other types of communications via external communication device 142A. In an embodiment, the communication status is a restriction, allowing only the communications specified in the communication status to reach external communication device 142A. In an embodiment, a communication status indicating "No Communications" bars communications, commanding presence management system 110 to not deliver communications. In an embodiment, the "No Communications" communication status allows presence management system 110 to notify external communication device 142A that a communication has been attempted by facility communication device 140B. The combination of communication status displays as well as the facilitation of communications by presence management system 110 allows for inmates and external individuals to establish communications in a continuous manner without the need to schedule a communication or without the fear that a user will be unavailable.

In an embodiment, presence management system 110 includes communication restriction and/or permission functionality. For example, presence management system 110 may allow a controlled facility 105 administrator to specify which individuals an inmate is allowed to contact and/or which individuals an inmate is not allowed to contact. For example, in an embodiment, presence management system 110 maintains a list in presence database 120 of individuals, phone numbers, email addresses, and/or other contact information that an inmate is allowed to contact and/or view a communication status. In an embodiment, an external individual registers with presence management system 110 in order for the inmate to communicate with the external individual and for both parties to view each other's communication status. In an embodiment, the jurisdiction may provide approval to the external individuals and may provide approval to family members, attorneys, educators for training purposes, and/or social service workers.

In an embodiment, presence management system 110 includes a list of individuals that the inmate is not allowed to contact. For example, in an embodiment, the inmate may be allowed to add contacts to the list of contacts associated with the inmate's user profile. In this case, if the inmate attempts to add a prohibited contact, presence management system 110 will not associate the prohibited contact with the inmate's user profile. The embodiment allows a controlled facility 105 administrator to control the individuals that the inmate is contacting. Similarly, presence management system 110 may control the type of communication allowed between an inmate and an external individual. For example, while video conference may be available between an inmate and an attorney or family members, the inmate may be restricted to audio calls with the inmate's friends. The communication status related to these individuals may reflect these restrictions, alerting the inmate to the restrictions.

In an embodiment, presence management system 110 also monitors the content of communications between communication devices as well as metrics related to the communications. For example, presence management system 110 monitors communications between an inmate using a facility communication device 140 and an external individual using external communication device 142A to determine if either party is sharing prohibited information. Presence management system 110 utilizes speech recognition software, visual recognition software, and/or optical pattern recognition to identify the content shared. In an embodiment, presence management system 110 records the communications in presence database 120 and record transcripts and/or text messages exchanged between the parties.

In an embodiment, presence management system 110 identifies metrics associated with the communication. These metrics may include the length of time of communication or the frequency of communication. For example, presence management system 110 records the length of an audio call or a video conference or the number of text messages sent and received.

In an embodiment, presence management system 110 restricts communications based on monetary funds associated with a user account. Presence management system 110 then uses gathered metrics to charge the accounts for usage of the communication system. An embodiment of this charging is further described with reference to FIG. 4. In an embodiment, presence management system 110 charges based on the length of the audio call or the video conference. In an embodiment, presence management system 110 charges based on the number of text messages sent and/or received. In an embodiment, presence management system 110 charges in order for a facility communication device 140 or an external communication device 142 to display communication statuses. In an embodiment, presence management system 110 includes a fee paying feature that allows an external individual utilizing external communication device 142 to pay certain communication fees related to an inmate's use of a facility communication device 140. This fee paying structure may aid in the implementation of presence management system 110.

Figure 2:
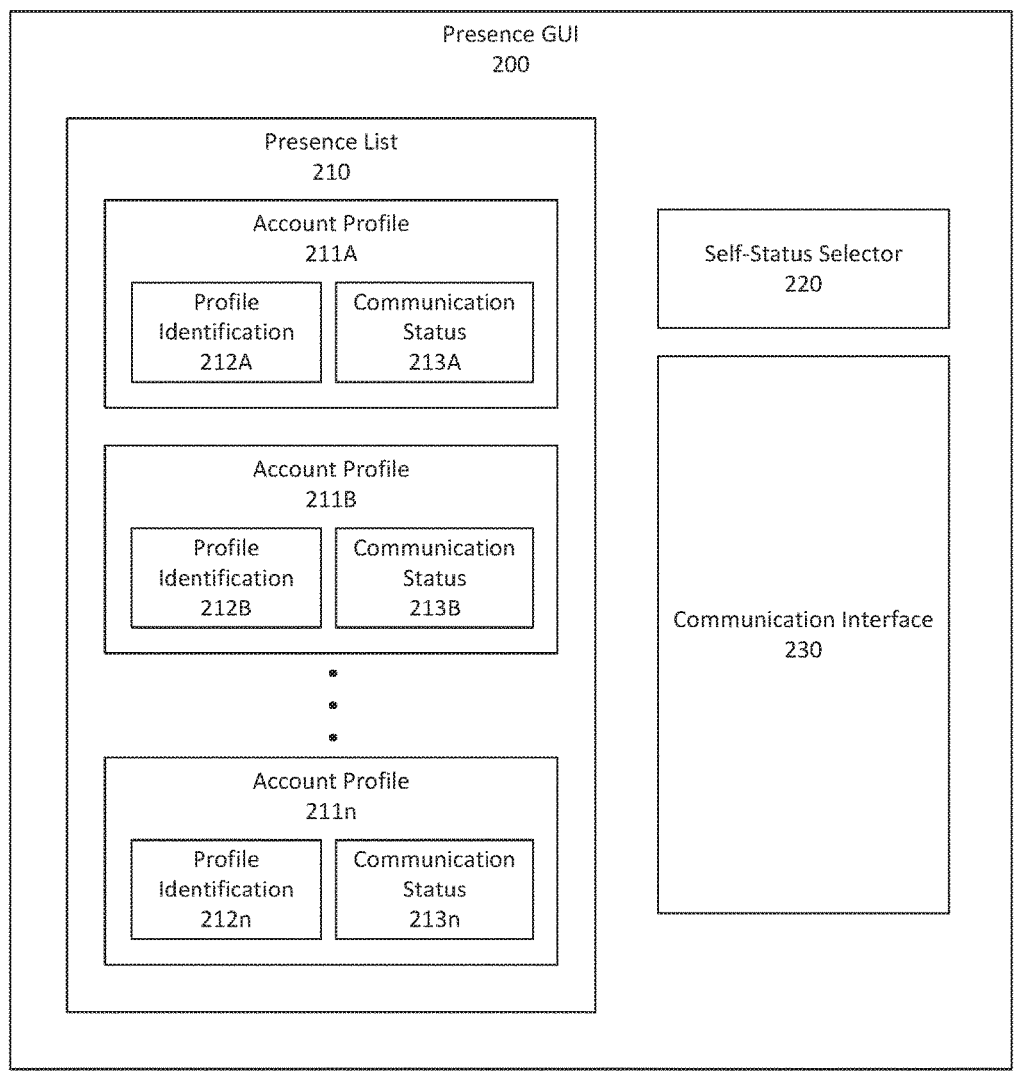
FIG. 2 illustrates a block diagram of presence graphical user interface, according to exemplary embodiments.

FIG. 2 illustrates a block diagram of presence graphical user interface (GUI) 200, according to exemplary embodiments. In an embodiment, presence GUI 200 allows a user to view communication statuses, set a self-communication status, and/or communicate with other individuals. In an embodiment described with reference to FIG. 1, facility communication devices 140 and/or external communication device 142 display presence GUI 200 on display screen hardware connected to each communication device. Displaying presence GUI 200 allows an inmate using a facility communication device 140 and/or an external individual using external communication device 142 to communicate with presence management system 110. Facility communication device 140 and/or external communication device 142 accepts commands and interactions with presence GUI 200 and transmits these commands to presence management system 110. Presence management system 110 receives the commands and interactions, including communication status updates and/or requests to establish communications. Presence management system 110 then transmits the communication status updates and/or requests to establish communications to other communication devices. In an embodiment, presence management system 110 uses a list stored in presence database 120 to determine the communication devices to which status updates or requests to establish communications are to be sent. In an embodiment, when presence management system 110 sends an updated communication status and/or a request to establish communications to a facility communication device 140 and/or an external communication device 142, the facility communication device 140 and/or the external communication device 142 will display the updated communication status and/or request to establish communications using presence GUI 200.

In an embodiment, a facility communication device 140 and/or an external communication device 142 displaying presence GUI 200 may initiate a communication with another facility communication device 140 or another external communication device 142 displaying another instance of presence GUI 200. Presence management system 110 facilitates this communication using network 130. The communication may include text messages, email messages, audio calls, video conferences, data sharing, desktop sharing, interactive whiteboard interfacing, project collaboration, and/or three-way calling. The type of communication available may depend on the communication status set for a particular party. For example, if a party indicates that the party is available for any communication except for video conferencing, presence management system 110 will not initiate video conferencing for that party. To set a communication status, a party utilizes an instance of presence GUI 200 displayed on a facility communication device 140 and/or on an external communication device 142.

In an embodiment, presence GUI 200 is instantiated on a facility communication device 140 and/or on an external communication device 142 via an Internet browser using browser-based protocols. This embodiment allows for browser-to-browser communications while using presence management system 110 to provide secure communications. In an embodiment, secure communications are needed to ensure that inmates do not contact unauthorized individuals. Presence management system 110 utilizes a list of prohibited individuals and/or a list of permitted individuals to provide secured communications. In an embodiment, presence management system 110 utilizes a WebRTC protocol to facilitate communications between facility communication device 140 and/or an external communication device 142. In an embodiment, presence management system 110 utilizes a Unified Communications protocol to facilitate the communications. In an embodiment, facility communication device 140 and/or external communication device 142 generates presence GUI 200 using a software application and/or an API installed on facility communication device 140 and/or external communication device 142.

When presence GUI 200 is displayed on a communication device, presence GUI 200 also displays a presence list 210, self-status indicator 220, and/or communication interface 230. Presence list 210 lists account profiles 211A, 221B, . . . , 211n and displays the account profiles 211 on a communication device. In an embodiment, account profiles 211 correspond to user accounts managed by presence management system 110 and/or stored in presence database 120. For example, an account profile 211 may be associated with an inmate of controlled facility 105 and/or an external individual. In an embodiment, presence management system 110 generates account profiles 211 based on a registration process of inmates and external individuals. Presence management system 110 also associates inmates with external individuals, either generating an association indicating the inmate is permitted to contact the external individual or that the inmate is prohibited from contact the external individual. In an embodiment where presence management system 110 does not allow an inmate to communicate with an external individual, the presence management system 110 will not generate an account profile 211 for the prohibited external individual. In an embodiment, a controlled facility 105 administrator determines the individuals with which an inmate may communicate.

In an embodiment, an inmate using facility communication device 140A may first access presence GUI 200 through browser and/or software interactions with facility communication device 140A. Presence GUI 200 will then display presence list 210. Presence GUI 200 will then populate presence list 210 with one or more account profiles 211 that the inmate has been permitted to interact with. For example, the inmate may be permitted to interact with the inmate's attorney. In this embodiment, presence management system 110 associates the inmate's attorney with account profile 211A. In an embodiment, presence management system 110 may also associate account profile 211A with external communication device 142A indicating that the inmate's attorney is capable of establishing communications with the inmate using external communication device 142A. In an embodiment, the inmate's attorney may view an instance of presence GUI 200 on external communication device 142A that indicates a communication status related to the inmate.

In an embodiment, presence management system 11 associates external communication device 142B and account profile 211B with a family member of the inmate. Using presence GUI 200 displayed on facility communication device 140A, the inmate can view communication status 213B information related to the family member using communication device 142B as well as initiate communications with the family member. In this manner, the inmate can view the presence of the family member based on the communication status 213B information even if the inmate does not initiate a communication. This presence informs the inmate regarding the availability status of the family member based on the displayed communication status.

In an embodiment, displayed account profiles 211 allow the inmate to view a profile identification 212 and a communication status 213 related to the account profile 211. In an embodiment, profile identification 212 includes an identification of the user associated with the corresponding account profile 211. For example, profile identification 212 may include a name, title, phone number, contact information, location information, image, profile picture, and/or other visual aid signifying the identity of the user associated with a particular account profile 211.

In an embodiment, a controlled facility 105 administrator identifies certain information related to profile identification 212 ad/or communication status 213 as a security risk. When information is a security risk, presence management system 110 hides the information from a facility communication device 140. For example, if an external communication device 142 is a fixed location device, such as, for example, a desktop computer or hardwired telephone, presence management system 110 identifies location information related to the fixed location device to be a security risk. If an inmate learns that an external communication device 140 is in a fixed location, the inmate may use this information to monitor when a user associated with the external communication device 140 is located at the fixed location device. For example, when a user accesses presence management system 110 from a fixed location device in the user's home, the inmate will know that the user is at home even if presence management system 110 does not report to the inmate that the user is at home. In these cases, presence management system 110 recognizes this unsecure information as a security risk that provides unintended information to the inmate.

To prevent the reporting of unsecure and/or unintentional information, presence management system 110 hides profile identification 212 and/or communication status 213 from the inmate. In an embodiment, presence management system 110 prevents a facility communication device from accessing presence GUI 200 or certain elements of presence GUI 200. For example, presence management system 110 prevents the facility communication device 140 from accessing the communication statuses 213 of compromised account profiles 211. In an embodiment, presence management system 110 prevents access to the profile identifications 212 and to the communication statuses 213 indefinitely after detecting a security risk. In another embodiment, presence management system 110 allows access to the profile identifications 212 and to the communication statuses 213 after determining that the information has been secured.

Communication status 213 is an identification of a status related to the user associated with account profile 211. Communication status 213 may be a user-specified parameter and/or may be supplied by presence management system 110. In an embodiment, communication status 213 indicates the availability of a user associated with an account profile 211. For example, a user associated with account profile 211A and using external communication device 142A provides a communication status 213A to presence management system 110. Presence management system 110 then determines that an inmate using facility communication device 140A is allowed to view the communication status 213A of account profile 211A. Presence management system 110 then transmits communication status 213A to facility communication device 140A. Facility communication device 140A then displays account profile 211A and communication status 213A using presence GUI 200.

In an embodiment, a communication status 213 indicates the types of communications that a user is willing to or is able to receive. For example, a user may specify that the user is willing to accept:

1) Text Messages, Audio Calls, and Video Conferences;
2) Only Text Messages and Audio Calls;
3) Only Text Messages; or
4) No Communications.

In an embodiment, the user may specify a communication status 213 in the negative. That is, the user may specify that the user is available to accept all types of communications, all types of communications except video conferencing, or all types of communications except video conference or audio calls. In an embodiment, a user may specify a communication status 213 of communications related to data sharing, desktop sharing, interactive whiteboard interfacing, project collaboration, and/or three-way calling.

When a user specifies a communication status 213, presence management system 110 stores the communication status 213 in presence database 120 and/or transmits the specified communication status 213 to other communication devices to be seen by other inmates and/or external individuals. In this embodiment, an inmate can view the communication status 213 of an external individual in real time and determine whether the external individual is available for a communication and also determine the types of communications available.

In an embodiment, communication status 213 also specifies scheduled communication sessions. For example, if an inmate and an external individual have scheduled a video conference to occur at a specified time, communication status 213 can list the agreed upon time. In an embodiment, communication status 213 also includes a timer that counts down until the scheduled communication. In an embodiment, a user may also specify a time when the user will be available. For example, to alert a family member, an inmate may specify that the inmate will be free starting at 5:00 PM. When the family member views the communication status 213 associated with the inmate, the family member can view the inmate's scheduled availability.

Similarly, in an embodiment, if a user is currently offline and/or unavailable for communications, communication status 213 indicates a time stating when the user was last online or available. This timestamp may be an absolute time such as "5:00 PM" or may be a relative time such as "15 minutes ago."

In an embodiment, communication status 213 also includes location information related to the user. For example, communication status 213 can report the last known position of an external individual based on metadata provided from an external communication device 142 to presence management system 110.

In an embodiment, presence management system 110 controls communication status 213, placing restrictions on communications. For example, if an inmate is being punished for misbehavior, presence management system 110 may not display a communication status 213 associated with an account profile 211. In an embodiment, presence management system 110 locks out the inmate, preventing the inmate from initiating and/or receiving communications from external individuals. In an embodiment, presence management system 110 includes a timestamp and/or countdown timer in displaying a communication status 213 indicating when communication restrictions will be lifted.

In an embodiment, communication status 213 also displays fee paying information. For example, using presence management system 110 to view communication statuses 213 and establish communications may require funding from an inmate or from an external individual. In an embodiment, presence management system 110 maintains account and funding information in presence database 120. In an embodiment, communication status 213 specifies the amount of money required to establish a communication with a particular account profile 211. In an embodiment, different account profiles 211 may cost different amounts of money to interact with. For example, for an inmate, communication with a friend may cost more money than communicating with a family member which may cost more money than communicating with an attorney, educator, or social worker. Similarly, different types of communications may cost different amounts of money. For example, a video conference may cost more money than an audio call. Presence management system 110 may track the length of the communication and charge per minute. In an embodiment, presence management system 110 also tracks text communications, charging based on the quantity (e.g., the number of messages) or length of the communications. Communication status 213 indicates the cost of communication. In an embodiment, an inmate and/or an external individual may be required to pay a cost to activate being able to view communication statuses.

In an embodiment, an inmate initiating a communication with an external individual can utilize presence management system 110 to initiate a "collect" communication. In this manner, the inmate can specify that the external individual will need to pay in order to accept the communication. If an external individual is viewing an instance of presence GUI 200 on an external communication device 142, a communication status 213 associated with an inmate may also include an indication asking whether the external individual accepts the charges of a communication initiated by the inmate.

In addition to viewing communication status 213 related to account profiles 211 listed in presence list 210, a user may also submit their own communication status using self-status selector 220. In an embodiment, self-status selector 220 is a menu or list and a user may select a communication status from the menu or list to represent the current communication status of the user. In an embodiment, the list includes the communication status options described with reference to communication status 213. In this case, a user of facility communication device 140 and/or external communication device 142 can utilize self-status selector 220 to report a communication status to presence management system 110. Presence management system 110 can then transmit the selected communication status to other communication devices associated with the account profile of the user of presence GUI 200. In an embodiment, after selecting a first communication status using self-status selector 220, the user can also select a second communication status, either coinciding with the first communication status or supplanting the first communication status.

In an embodiment, rather than selecting from a menu of communication statuses, a user may enter a custom communication status using self-status selector 220. A user may type a communication status and may indicate which types of communications that the user is willing to receive. In an embodiment, if a user is permitted to input a custom communication status, presence management system 110 will monitor entries to ensure that no unauthorized messages are being displayed as a communication status 213. For example, presence management system 110 will identify unauthorized information or profanity and not display the unauthorized information to other users. In an embodiment, presence management system 110 will alert a controlled facility 105 administrator in response to detecting an unauthorized communication status. In this manner, presence management system 110 can ensure that an inmate or an external individual will not use a communication status to circumvent message content monitoring provided by presence management system 110.

In an embodiment, self-status selector 220 selects a default communication status when a user first interacts with presence GUI 200. For example, presence GUI 200 may be hidden as a background browser window or application. When the user interact with presence GUI 200, bringing presence GUI 200 to the foreground, self-status selector may indicate that the user is available for communications. In an embodiment, when a user first powers on a facility communication device 140 or external communication device 142, presence GUI 200 will initialize and select a default communication status at self-status selector 220. In an embodiment, a user specifies this default communication status.

In an embodiment, presence GUI 200 includes a communication interface 230. Communication interface 230 allows the facilitation of communications between users of presence management system 110. For example, communication interface facilitates communications between facility communication devices 140 and external communication devices 142. In an embodiment, communication interface 230 is integrated in presence GUI 200 and is implemented using browser-based protocols and/or application software that provides presence GUI 200. In an embodiment, communication 230 is an underlying communication application separate from presence GUI 200. In this case, presence GUI 200 initiates communication but the underlying communication application instantiates communication interface 230 and facilitates the interaction. This embodiment is discussed further with reference to FIGS. 3A and 3B.

To initialize communication interface 230, in an embodiment, a user selects a communication method associated with an account profile 211. For example, the user may use an input pointer device and/or may use a tap on a touch-screen display to select the desired account profile 211. The selected account profile 211 then produces a menu of available communication types for the user to select. Based on the users selection of communication type, communication interface 230 initializes and facilitates communications between the user and the user associated with the selected account profile 211.

In an embodiment, based on the communication status 213 of the selected account profile, some options may be unavailable. For example, if account profile 211B has indicated that the user is unavailable for video conferencing using communication status 213B, the user of presence GUI 200 will not be able to select video conferencing to initialize communication interface 230.

Communication interface 230 changes depending on the selected communication type. For example, communication interface 230 may be a chat messaging interface or an email messaging interface if textual communication is selected. In an embodiment, the chat messaging interface or email messaging interface includes a virtual keyboard allowing a user to input a textual message. Communication interface 230 displays messages sent and/or messages received in this embodiment.

In an embodiment, communication interface 230 displays video to allow for video conferencing. For example, if a user of presence GUI 200 chooses to initiate a video with account profile 211B, communication interface 230 displays a video stream from the communication device associated with account profile 211B. In an embodiment, communication interface 230 also includes a small display of a video of the user using presence GUI 200, displaying images captured from a self-facing camera. In an embodiment that facilitates an audio communication, communication interface 230 includes a visual indicator of decibels or an indicator of voice volume to show that audio is being streamed.

To illustrate an embodiment of the operation of communication interface 230, an inmate first views presence GUI 200 on a facility communication device 140A. The inmate then see that account profile 211A displays a communication status 213A that indicates that the external individual associated with account profile 211A is available for video conference. The inmate interacts with the account profile 211A interface to initiate a video conference with the external individual. Communication interface 230 then displays the video transmitted by the external individual.

In an embodiment, presence management system 110 monitors this communication. Presence management system 110 monitors the communication to ensure that unauthorized communications do not occur. For example, presence management system 110 may detect the presence of unauthorized third parties participating in a communication either through audio voiceprint recognition or visual image recognition. In an embodiment, presence management system 110 is configured to end communications and prevent future communications upon detection of an unauthorized communication. In an embodiment, presence management system 110 alerts a controlled facility 105 administrator when an unauthorized communication is detected. In an embodiment, controlled facility 105 administrators can use presence management system 110 to view video, listen to audio, or read textual information exchanged during a communication between an inmate using a facility communication device 140 and an external individual using an external communication device 142.

In an embodiment, communication interface 230 also allows for data sharing, desktop sharing, interactive whiteboard interfacing, project collaboration, and/or three-way calling. In an embodiment, to share data, a user can drag and drop files into communication interface 230 to transmit to another user. In an embodiment, presence management system 110 utilizes a WebRTC protocol and/or a Unified Communications protocol to facilitate communications between facility communication device 140 and/or an external communication device 142 via communication interface 230. Facility communication device 140 and/or external communication device 142 display communication interface 230 when displaying presence GUI 200. In an embodiment, facility communication device 140 and/or external communication device 142 facilitates communications displayed on communication interface 230 using a software application and/or an API installed on facility communication device 140 and/or external communication device 142.

Although FIG. 2 displays differently sized elements of presence GUI 200, presence list 210, self-status selector 220, and/or communication interface 230 can be differently shaped, sized, and positioned relative to the embodiment depicted in FIG. 2.

Figure 3A:
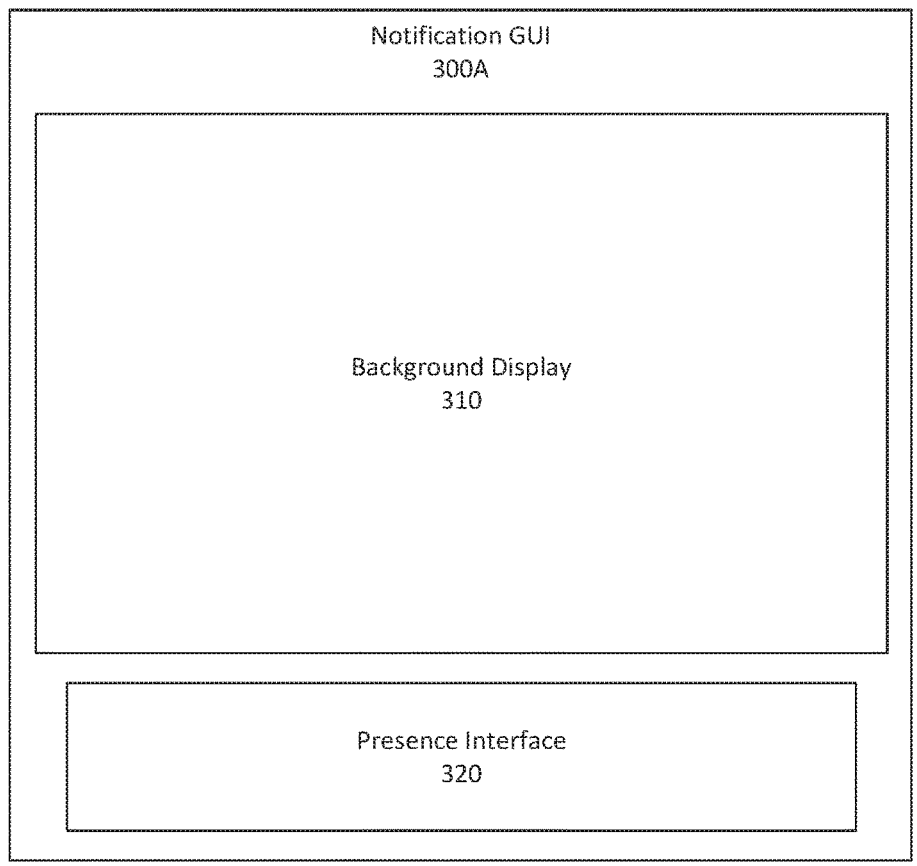
FIG. 3A illustrates a block diagram of a notification graphical user interface, according to exemplary embodiments.
Figure 3B:
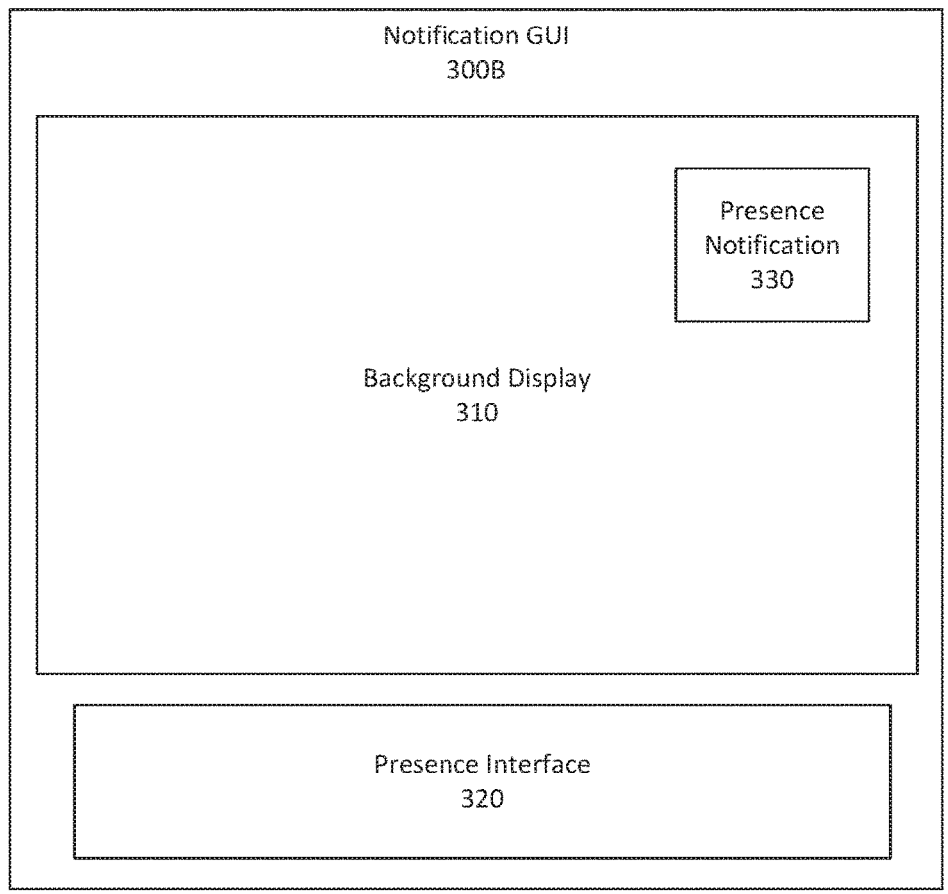
FIG. 3B illustrates a block diagram of a notification graphical user interface highlighting a present notification, according to exemplary embodiments.

FIG. 3A illustrates a block diagram of a notification graphical user interface (GUI) 300A, according to exemplary embodiments. FIG. 3B illustrates a block diagram of a notification graphical user interface (GUI) 300B highlighting a present notification, according to exemplary embodiments. Notification GUI 300A includes a background display 310 and a presence interface 320. Notification GUI 300B also includes background display 310 and presence interface 320 but additionally includes presence notification 330. In an embodiment, notification GUI 300A and notification GUI 300B display the same graphical user interface at two different transition points in time. In an embodiment, notification GUI 300A represents a past time point while notification GUI 300B represents a point in time after notification GUI 300A. In an embodiment, this point in time corresponds to the instantiation of presence notification 330 that appears on notification GUI 300B but does not appear in notification GUI 300A.

In an embodiment, a facility communication device 140 and/or an external communication device 142 may first display notification GUI 300A. When facility communication device 140 and/or external communication device 142 receives a presence notification from presence management system 110, facility communication device 140 and/or external communication device 142 transitions to notification GUI 300B and displays presence notification 330. In an embodiment, the receipt of presence notification 330 causes the transition of notification GUI 300A to notification GUI 300B. In an embodiment, in response to clearing presence notification 330, a facility communication device 140 and/or an external communication device 142 displaying notification GUI 300B returns to display notification GUI 300A.

Before discussing presence notification 330, background display 310 and presence interface 320 will be discussed. In an embodiment, background display 310 is a graphical user interface displayed on a facility communication device 140 and/or an external communication device 142. In an embodiment, background display 310 represents other applications, software, and/or graphical user interfaces installed on a facility communication device 140 and/or an external communication device 142 that do not interface with presence management system 110. In an embodiment, background display 310 is a home screen or a web browser that is not connected to presence management system 110.

In an embodiment, presence interface 320 is a graphical user interface allowing a user to view communication statuses. In an embodiment, presence interface 320 is a representation of presence GUI 200 as described with reference to FIG. 2. For example, presence interface 320 may be an entire display of presence GUI 200 or may be a minimized display version showing certain features of presence GUI 200. In an embodiment where presence interface 320 is a minimized version of presence GUI 200, a user can interact with presence interface 320 to expand presence interface 320 and view the entirety of presence GUI 200. In an embodiment, when presence interface 320 is expanded, a presence interface 320 covers the entirety of or a portion of background display 310.

In an embodiment, presence interface 320 is a persistent application displayed on a facility communication device 140 and/or an external communication device 142. In this case, a user can interact with other applications and software using background display 310 while presence interface 320 remains in view as a portion of notification GUI 300A and 300B. In an embodiment where presence interface 320 displays communication interface 230, presence interface 320 facilitates communications between users while still allowing a user to navigate other applications or software programs using background display 310. For example, if a video communication is established between two users, presence interface 320 displays the video feed while allowing a user to still interact with background display 310.

In an embodiment, a user can hide presence interface 320. To access presence interface 320, a user selects a portion of background display 310 that initializes presence interface 320.

In an embodiment, presence notification 330 is a graphical user interface element indicating a change in communication status or indicating a request to establish communications. In an embodiment, presence notification 330 may appear on a facility communication device 140 and/or an external communication device 142 displaying notification GUI 300B when presence management system 110 sends a communication status change or a request to establish communications.

For example, an inmate displaying notification GUI 300A on facility communication device 140A may receive communication status updates from an external individual associated with an account profile 21 IA. When the external individual sends an updated communication status 213A to presence management system 110, presence management system 110 transmits this updated communication status 213A to facility communication device 140A. In an embodiment, this transmission causes facility communication device 140A to display notification GUI 300B and display presence notification 330. In an embodiment, presence notification 330 appears in background display 310. Presence notification 330 indicates that the external individual has updated his or her communication status. The appearance of presence notification 330 informs the inmate of the updated communication status.

In an embodiment, presence notification 330 indicates a request to establish communications. For example, an external communication device 142A is displaying notification GUI 300A. External communication device 142A also indicates that the associated user is available to accept audio calls or text messages in an associated communication status 143. An inmate using a facility communication device 140A may see this communication status 143 and attempt to establish an audio call with external communication device 142A. The inmate utilizes facility communication device 140A to send this request to presence management system 110. Presence management system 110 then routes this request to external communication device 142A. Upon receipt of this request, external communication device 142A displays notification GUI 300B and presence notification 33. The appearance of presence notification 330 informs the external individual that the inmate is attempting to establish a communication with the external individual.

In an embodiment, presence notification 330 is a visual indicator displaying an updated communication status and/or a request to establish communication. For example, presence notification 330 may be a text box stating that a particular account profile 211 has changed a corresponding communication status 213. The text box lists the profile identification 212 associated with the account profile 211 as well as the new communication status 213. In an embodiment, presence notification 330 indicates when a user is available for communication and/or when a user is not available for communication. In an embodiment, when a user associated with account profile 211 powers on a device or becomes online by establishing a connection with presence management system 110 via network 130, notification GUI 300B displays presence notification 330. In an embodiment, instead of providing a text box that displays information related to communication status 213, presence notification 330 is a visual indicator, such as a symbol, object, and/or color indicator, indicating that a communication status 213 has changed but the user will need to access presence interface 320 and/or presence GUI 200 in order to view the specific account profile 211 and/or the specific communication status.

In an embodiment, presence notification 330 indicates a received request to establish a communication. In an embodiment, presence notification 330 is a text box listing profile identification 212 and the type of communication requested. In an embodiment, a user can interact with presence notification 330 to either accept or reject the communication. For example, the user may select whether to accept or reject a video conference, phone call, and/or text message. In an embodiment, when a user accepts a communication, presence interface 320 expands to cover a larger area of notification GUI 300B. Presence interface 320 also displays presence GUI 200 and facilitates the communication using communication interface 230. In an embodiment where presence interface 320 occupies a smaller area relative to background display 310, presence notification 330 allows for notification of a communication status update In an embodiment, a user dismisses presence notification 330 after reading the communication status update and/or after rejecting a communication. In this embodiment, a communication device displaying notification GUI 300B transitions to display notification GUI 300A.

Figure 4:
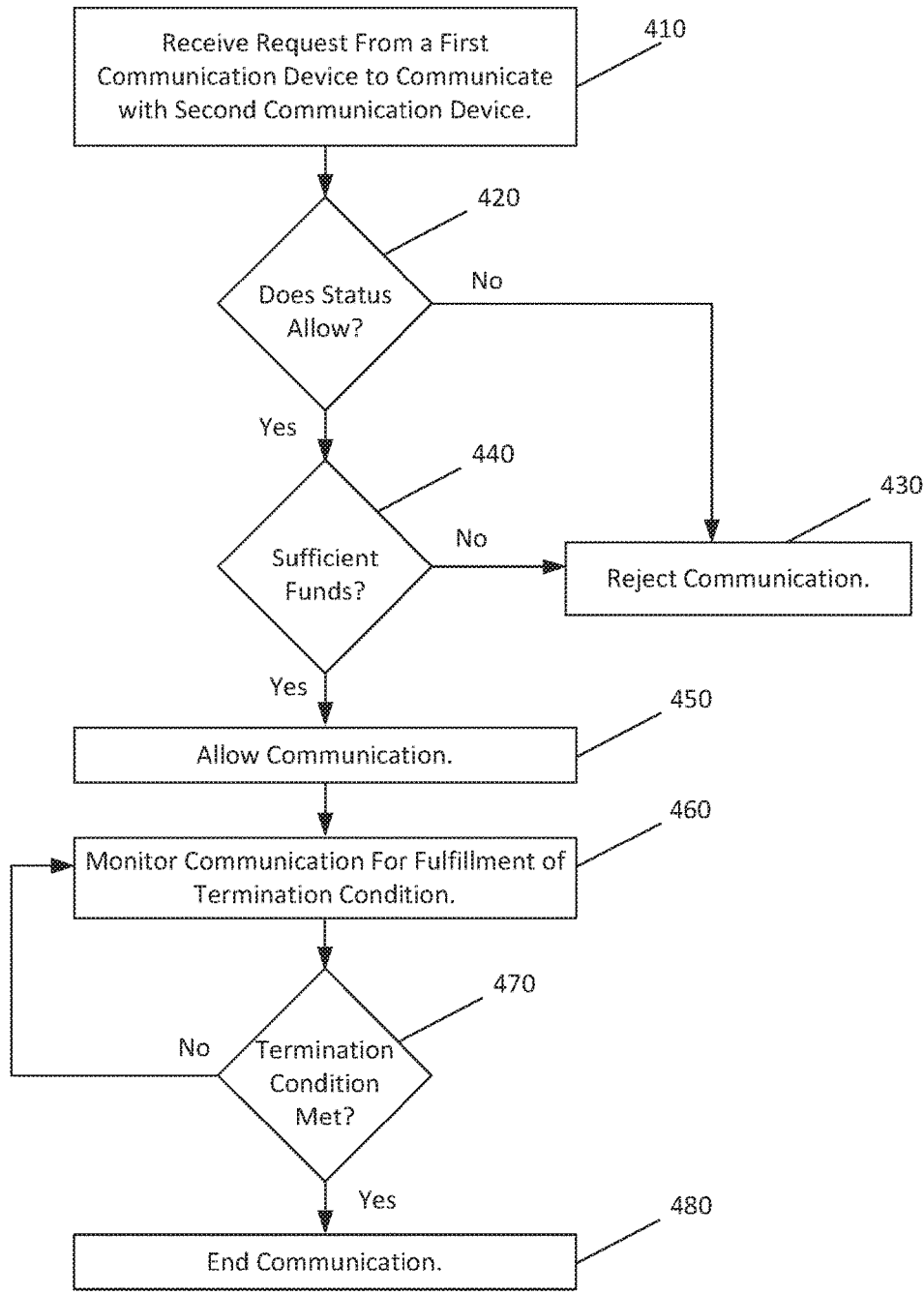
FIG. 4 illustrates a flowchart illustrating a method for communication monitoring, according to exemplary embodiments.

FIG. 4 illustrates a flowchart illustrating a method 400 for communication monitoring, according to exemplary embodiments. Method 400 shall be described with reference to FIG. 1; however, method 400 is not limited to that example embodiment.

In an embodiment, presence management system 110 utilizes method 400 to facilitate communication requests and monitor established communications. The foregoing description will describe an embodiment of the execution of method 400 with respect to presence management system 110. While method 400 is described with reference to presence management system 110, method 400 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 4, as will be understood by a person of ordinary skill in the art.

In an embodiment, at 410, presence management system 110 receives a request from a first communication device to communicate with a second communication device. The first and second communication devices may be a facility communication device 140 or an external communication device 142. For example, an inmate using facility communication device 140A may send a request to presence management system 110 attempting to establish a communication with an external individual using external communication device 142A. Alternatively, an external individual using external communication device 142A may send a request to presence management system 110 attempting to establish a communication with an inmate. In an embodiment, the communication request specifies the type of communication sought to be established. At 410, presence management system 110 receives this communication request.

In an embodiment, at 420, presence management system 110 determines whether a status associated with the second communication device permits the desired communication. In an embodiment, this determination examines a communication status associated with the second communication device. For example, if an external individual has specified using an external communication device 142 that the external individual is unavailable for video conferencing, presence management system 110 will recognize this status indication and prevent attempts to establish video conferencing communications with the external communication device 142. In an embodiment, presence management system 110 will retrieve this information from presence database 120.

In an embodiment, at 420, presence management system 110 also checks a list of authorized and/or unauthorized individuals to ensure that no unauthorized communications are established. For example, if an inmate is allowed to only communicate with certain individuals, presence management system 110 will check to make sure that it does not establish a communication with an unauthorized individual. Similarly, if an inmate is specifically barred from contact an individual, presence management system 110 will check to ensure that this communication is not established. In an embodiment, presence database 120 stores lists indicating individuals that an inmate is permitted to contact or prohibited from contacting. The list stores contact information such as a name, phone number, email address, or other identifying information. A controlled facility 105 administrator may define the lists. Presence management system 110 retrieves this list information to ensure that no unauthorized communications are established.

Based on the status determination at 420, presence monitoring system 110 will either reject the communication at 430 or determine whether the user has sufficient funds to establish the communication at 440. At 430, presence monitoring system 110 will reject the communication request when the communication status of the second communication device indicates that user of the second device is unavailable for a certain communication type or is unavailable for any type of communication. Presence monitoring system 110 will also reject the communication request when the user of the first communication device is prohibited from contacting the user of the second communication device. In an embodiment, when presence monitoring system 110 rejects the communication request at 430, presence monitoring system 110 sends a notification to the first communication device alerting the first communication device that the communication has been rejected. In an embodiment, this notification also includes a reason for rejection, such as, for example, because the second communication device is unavailable for communications, the second communication device is unavailable for the specific type of communication requested, the first communication device is prohibited from contacting the second communication device, and/or because the first communication device has insufficient funds in a corresponding account.

In an embodiment, at 440, if the status check allows the requested communication, presence monitoring system 110 determines if an account associated with the first communication device has sufficient monetary funds to finance the requested communication. In an embodiment, presence database 120 manages account information indicating the amount of funds associated with an account. To establish a communication, presence management system 110 withdraws funds from this account.

In an embodiment, establishing a communication with different account profiles costs different amounts of money. For example, for an inmate, communication with a friend may cost more money than communicating with a family member which may cost more money than communicating with an attorney, educator, or social worker. Similarly, different types of communications may cost different amounts of money. For example, a video conference may cost more money than an audio call.

In an embodiment, an inmate initiating a communication with an authorized external individual can utilize presence management system 110 to initiate a "collect" communication. In this manner, the inmate can specify that the external individual will need to pay in order to accept the communication. If an external individual is viewing an instance of a presence GUI on an external communication device 142, a communication status associated with an inmate may also include an indication asking whether the external individual accepts the charges of a communication initiated by the inmate. In an embodiment, this procedure occurs at 440 when presence management system 110 determines if there are sufficient funds associated with the first communication device.

If sufficient funds are not available or if the second communication device provides an indication that the user will not pay for the communication, presence management system 110 rejects the communication request at 430 and does not establish a communication. In an embodiment, presence management system 110 provides a notification to the first communication device stating the reason why the communication was rejected.

If sufficient funds are available, at 450, presence management system 110 allows the communication. In an embodiment, presence management system 110 allows the communication after withdrawing a preset amount of money from an account associated with the first communication device. This preset amount of money corresponds to establishing the communication.

In an embodiment, presence management system 110 allows the communication in response to acceptance by the second communication device of the communication. For example, if the communication is a streaming audio call and/or video conference, presence management system 110 may first send a notification to the second communication device to inform the second communication device that the first communication device is attempting to establish a communication. In response to receiving an acceptance of the communication from the second communication device, presence management system 110 will establish a communication using network 130.

In an embodiment where the communication is a text message such as a chat message or email message, presence management system 110 will deliver the message to the second communication device without first asking if the second communication device accepts the message. If the first communication device uses a "collect" payment option, however, the presence management system 110 will first receive authorization from the second communication device to charge an account associated with the second communication device before displaying the message.

In an embodiment, at 460, once presence management system 110 has established a communication between the first communication device and the second communication device, presence management system 110 monitors the communication for fulfillment of a termination condition. At 470, the presence management system determines whether the termination condition is met. If the termination condition is not met, presence management system 110 continues to monitor the communication at 460. If the termination condition is met, presence management system 110 terminates the communication at 480. The fulfillment of the termination condition causes the presence management system 110 to end the communication.

In an embodiment, at 460, presence management system 110 tracks the time elapsed for audio and/or video communications. In an embodiment, based on time limits associated with an inmate, presence management system 110 may end a communication at 480 when the length of the communication exceeds a time limit. This time limit serves as the termination condition. In an embodiment, to end the communication at 480, presence management system 110 hides a video and/or audio graphical user interface display, preventing further communication via presence management system 110.

In an embodiment, monitoring of the communication is dependent on the amount of funds associated with an account. In an embodiment, presence management system 110 charges per minute based on the time elapsed for video and/or audio conferences. In this case, presence management system 110 may associating sufficient funding with the termination condition and terminate the communication at 480 when an inmate has depleted his or her funding. If the funding is depleted to a certain level, the termination condition at 470 is met.

In an embodiment, monitoring of the communication at 460 includes monitor chat messages and/or email messages. In an embodiment, a timing element is also associated with textual messages, allowing the first and second communication devices to send text messages over a certain period of time. In an embodiment, presence management system 110 limits the textual messages based on the quantity of messages sent, received, or exchanged and/or the length of the content of the textual messages. For example, in an embodiment, presence management system 110 sets a threshold indicating the number of characters that a user can send. Once a user has exceeded the threshold number of messages and/or characters, the termination condition is met at 470 and presence monitoring system 110 ends the communication at 480. In an embodiment, ending the communication includes hiding a textual graphical user interface, which prevents a user from submitting more messages.

Figure 5:
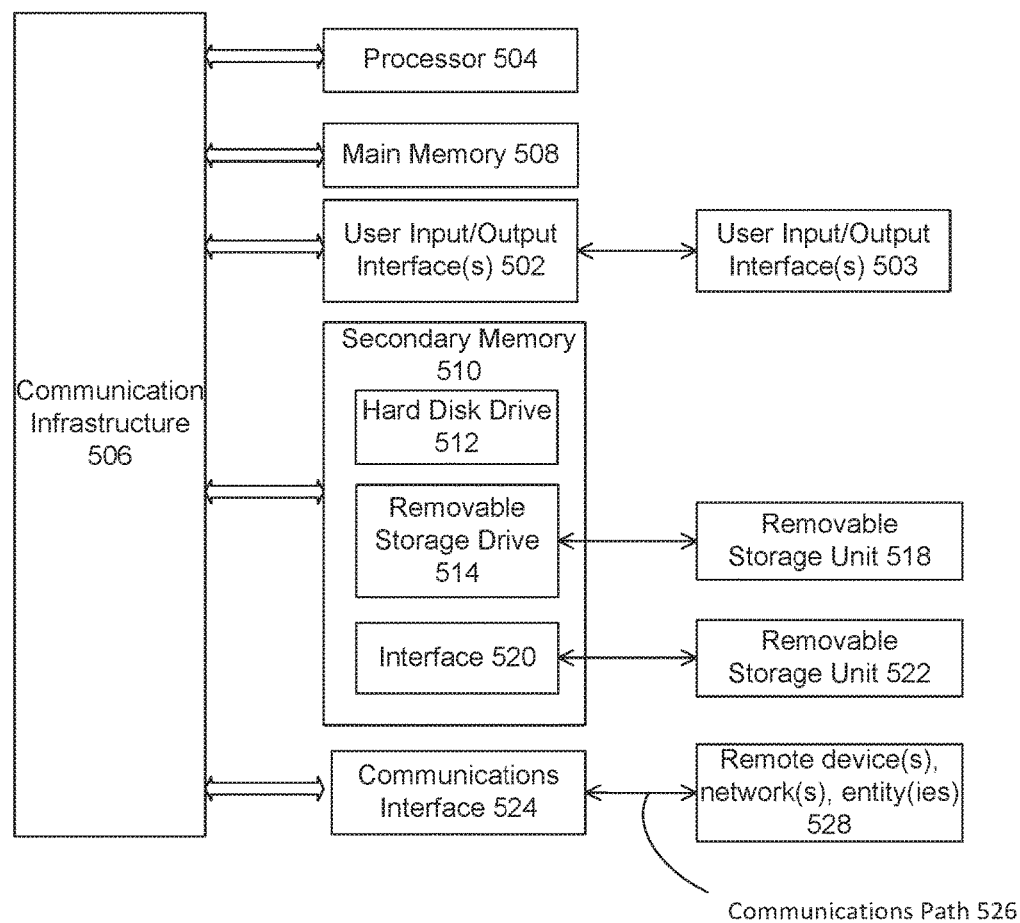
FIG. 5 illustrates an example computer system useful for implementing various embodiments.

Referring now to FIG. 5, various embodiments may be implemented, for example, using one or more computer systems, such as computer system 500 shown in FIG. 5. One or more computer systems 500 (or portions thereof) can be used, for example, to implement method 400 of FIG. 4.

Computer system 500 can be any well-known computer capable of performing the functions described herein.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 406 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communication path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments using data processing devices, computer systems and/or computer architectures other than that shown in FIG. 5. In particular, embodiments may operate with software, hardware, and/or operating system implementations other than those described herein.

It is to be appreciated that the Detailed Description section, and not the Abstract section, is intended to be used to interpret the claims. The Abstract section may set forth one or more but not all exemplary embodiments as contemplated by the inventor(s), and thus, are not intended to limit the disclosure or the appended claims in any way.

While the disclosure has been described herein with reference to exemplary embodiments for exemplary fields and applications, it should be understood that the scope of the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of disclosed inventions should not be limited by any of the above-described exemplary embodiments, but should be defined only in accordance with the following claims and their equivalents.

What is claimed is:

1. A presence management system, comprising:
a memory; and
one or more processors and/or circuits coupled to the memory, wherein the one or more processors are configured to:
receive a command from a first communication device indicating one or more acceptable communication types for a first user account accessing the first communication device;
compare the one or more acceptable communication types to a restricted communication type corresponding to the first user account;
determine that the one or more acceptable communication types differ from the restricted communication type;
in response to the determining, transmit graphical user interface data to a second communication device for a second user account, the graphical user interface data including a communication status of the first communication device, wherein the communication status includes the one or more acceptable communication types for the first communication device;
receive a communication request from the second user account accessing the second communication device and attempting to establish a communication of a first communication type with the first communication device;
compare the first communication type with the one or more acceptable communication types for the first user account;
in response to the comparing, determine that the first communication type does not match any of the one or more acceptable communication types; and
reject the communication request in response to the determining.

2. The presence management system of claim 1, wherein the one or more processors are further configured to:
transmit a message to the second communication device indicating that the first communication type does not match any of the one or more acceptable communication types.

3. The presence management system of claim 1, wherein to receive the communication request, the one or more processors and/or circuits are further configured to:
receive the communication request via a user selection from a list of communication types displayed on a graphical user interface generated using the graphical interface data.

4. The presence management system of claim 1, wherein the one or more processors and/or circuits are further configured to:
receive a second communication request from the second communication device attempting to establish a communication of a second communication type with the first communication device;
determine that the second communication type matches a communication type of the one or more acceptable communication types; and
in response to determining that the second communication type matches a communication type of the one or more acceptable communication types, establish a channel for communication between the first communication device and the second communication device according to the second communication type.

5. The presence management system of claim 4, wherein the second communication type is a video conference and to establish the channel for communication, the one or more processors and/or circuits are further configured to:
receive a first video stream from the first communication device;
receive a second video stream from the second communication device;
monitor the first video stream and the second video stream to detect unauthorized content;
transmit the first video stream to the second communication device; and
transmit the second video stream to the first communication device.

6. The presence management system of claim 5, wherein the one or more processors and/or circuits are further configured to:
terminate the channel in response to detecting unauthorized content in the first video stream or the second video stream.

7. The presence management system of claim 1, wherein the one or more processors and/or circuits are further configured to:
receive a second command from the first communication device, wherein the second command indicates a second one or more acceptable communication types acceptable by the first user account; and
transmit an alert to the second communication device indicating receipt of the second command.

8. A method, comprising:
receiving a command from a first communication device indicating an acceptable communication type for a first user account accessing the first communication device;
comparing the acceptable communication type to a restricted communication type corresponding to the first user account;
determining that the acceptable communication type differs from the restricted communication type;
in response to the determining, transmitting graphical user interface data to a second communication device for a second user account, the graphical user interface data including the acceptable communication type for the first communication device;
receiving a communication request from the second user account accessing the second communication device and attempting to establish a communication of a first communication type with the first communication device;
comparing the first communication type with the acceptable communication type for the first user account;
in response to the comparing, determining that the first communication type matches the acceptable communication type; and
transmitting the communication request to the first communication device in response to the determining.

9. The method of claim 8, wherein the acceptable communication type is text messaging and transmitting the communication request further comprises:
delivering a text message from the second communication device to the first communication device;
in response to the delivering, detecting that the first communication device has received a number of text messages exceeding a text message threshold; and
in response to the detecting, terminating the communication request.

10. The method of claim 8, wherein receiving the command further comprises receiving a command from the first communication device from within a secure facility network and wherein receiving the communication request further comprises receiving the communication request from a network external to the secure facility network.

11. The method of claim 8, wherein the acceptable communication type is a video conference, the method further comprising:
establishing a channel for communication between the first communication device and the second communication device; and
monitoring a video conference between the first communication device and the second communication to detect unauthorized content.

12. The method of claim 8, further comprising:
transmitting a notification to the first communication device indicating that the first communication type of the communication request matches the acceptable communication type.

13. The method of claim 8, further comprising:
receiving a second command from the first communication device, wherein the second command indicates a second one or more acceptable communication types acceptable by the first user account; and
transmitting an alert to the second communication device indicating the receipt of the second command.

14. A method, comprising:
transmitting first graphical user interface data to a first communication device for a first user account, the first graphical user interface data listing a plurality of communication types;
receiving a selection of a first communication type from the plurality of communication types from the first communication device;
comparing the first communication type to a restricted communication type corresponding to the first user account;
determining that the first communication type differs from the restricted communication type;
in response to the determining, updating data associated with the first user account to designate the first communication type as a designation of an acceptable communication type for the first communication device;
transmitting second graphical user interface data to a second communication device for a second user account, the second graphical user interface data including the acceptable communication type for the first communication device;
receiving a communication request from the second user account accessing the second communication device and attempting to establish a communication of a second communication type with the first communication device;
comparing the second communication type with the acceptable communication type for the first user account;
in response to the comparing, determining that the second communication type matches the acceptable communication type; and
transmitting the communication request to the first communication device in response to the determining.

15. The method of claim 14, further comprising:
transmitting a notification to the first graphical user interface indicating that the first communication type of the communication request matches the acceptable communication type.

16. The method of claim 14, wherein transmitting the communication request further comprises:
receiving a video stream via the second graphical user interface; and
displaying the video stream on the first graphical user interface.

17. The method of claim 14, wherein the acceptable communication type is a video conference, the method further comprising:
establishing a channel for communication between the first communication device and the second communication device;
receiving a first video stream from the first communication device;
receiving a second video stream from the second communication device;
monitoring the first video stream and the second video stream to detect unauthorized content;
transmitting the first video stream to the second communication device; and
transmitting the second video stream to the first communication device.

18. The method of claim 17, further comprising:
terminating the channel in response to detecting unauthorized content in the first video stream or the second video stream.

19. The method of claim 14, further comprising:
receiving a second selection from the first communication device, wherein the second selection indicates change of the acceptable communication type from the first communication type to a second communication type; and
transmitting an alert to the second communication device indicating the receipt of the second selection.

20. The method of claim 14, further comprising:
receiving a second selection from the first communication device, wherein the second selection indicates a designation of a second acceptable communication type; and
transmitting an alert to the second communication device indicating the receipt of the second selection.

* * * * *